United States Patent [19]
Nakajima et al.

[11] Patent Number: 5,712,023
[45] Date of Patent: Jan. 27, 1998

[54] THERMOPLASTIC RESIN STRETCHED FILM LAMINATE HAVING EXCELLENT PRINTABILITY

[75] Inventors: Mitsuo Nakajima; Kenji Nakajima, both of Ibaraki; Masayuki Inoue, Tokyo, all of Japan

[73] Assignee: Oji-Yuka Synthetic Paper Co., Ltd., Tokyo, Japan

[21] Appl. No.: 611,676

[22] Filed: Mar. 6, 1996

[30] Foreign Application Priority Data

Apr. 4, 1995 [JP] Japan .................. 7-101576

[51] Int. Cl.$^6$ .................. B32B 3/00
[52] U.S. Cl. .................. 428/195; 428/213; 428/330; 428/402; 428/409; 428/411.1; 428/688
[58] Field of Search .................. 428/411.1, 500, 428/195, 213, 402, 409, 688, 330; 525/240, 528; 427/212

[56] References Cited

U.S. PATENT DOCUMENTS

| 5,268,349 | 12/1993 | Ohno et al. ............... 503/227 |
| 5,306,690 | 4/1994 | Ohno et al. ............... 503/227 |

FOREIGN PATENT DOCUMENTS

| 0540020 | 5/1993 | European Pat. Off. . |
| 0568093 | 11/1993 | European Pat. Off. . |
| 0666183 | 8/1995 | European Pat. Off. . |

*Primary Examiner*—William Krynski
*Attorney, Agent, or Firm*—Dilworth & Barrese

[57] ABSTRACT

A thermoplastic resin stretched film laminate is described, which comprises a biaxially stretched thermoplastic resin film base layer having provided on one or both sides thereof a surface layer, the surface layer comprising a uniaxially stretched thermoplastic resin film containing 3 to 30% by weight of a petroleum resin, 30 to 65% by weight of precipitated calcium carbonate having a particle size of 0.1 to 3 μm, and 32 to 67% by weight of a thermoplastic resin and having a thickness of not less than 2 μm.

12 Claims, 2 Drawing Sheets

THERMOPLASTIC RESIN STRETCHED FILM LAMINATE HAVING EXCELLENT PRINTABILITY

FIELD OF THE INVENTION

This invention relates to a thermoplastic resin stretched film laminate having excellent printability which, when offset printed with general-purpose offset inks of oxidative polymerization type (drying oil type), is prevented from developing unevenness or curling due to the vehicle of the offset inks and also which allows the inks applied thereto to dry rapidly.

BACKGROUND OF THE INVENTION

Lithography, generally called offset printing, easily achieves multicolor printing and is used for printing on paper, polyethylene terephthalate films, polyamide films, pigment coated paper, etc.

In particular, general-purpose drying type offset inks have the composition shown in Tables 1 and 2 below.

TABLE 1

Basic Composition of Offset Ink

Offset Ink
- Main components
  - Pigment
    - Organic pigment
    - Inorganic pigment
  - Vehicle
    - Synthetic resin
    - Vegetable oil (Drying oil)
    - Solvent (High-boiling petroleum series solvent)
- Auxiliaries
  - Viscosity modifier
    - Solvent
    - Diluted varnish
    - Polymer
  - Drying controlling agent
    - Drier
    - Drying inhibitor
  - Other additives
    - Wax, Membrane-reinforcing agent, Back stain inhibitor, etc.

TABLE 2

Composition of Offset Inks (parts by weight)

|  | For Sheet Fed Press | For Non-Paper | For Web Offset Press |
| --- | --- | --- | --- |
| Pigment | 25 | 25 | 25 |
| Resin | 25 | 30 | 25 |
| Drying oil | 20 | 34 | 10 |
| High-boiling petroleum series solvent* | 25 | 5 | 36 |
| Drier | 1 | 2 | — |
| Others | 4 | 4 | 4 |
| Totals | 100 | 100 | 100 |

*Spindle oil or light oil having a boiling point of 270 to 320° C.

The vehicle in Table 1 constitutes the liquid portion of the printing ink, serving to disperse the pigment and fluidize the ink so that the ink may be transferred smoothly on a printing machine from an ink fountain to printing paper via rollers, a printing plate, and a blanket. The vehicle turns solid after printing, serving to fix the pigment on the printed surface. The vehicles are divided into a linseed oil type, an alkyd resin type, a quick-drying resin type, and a heat-set type.

It has recently been desired to reduce the drying time of offset ink to improve printing speed. To this effect, a quick-drying ink containing, as the vehicle, a drying oil compounded with a resin and a mineral oil (high-boiling petroleum series solvent) has been used. However, when a polyolefin film or synthetic paper comprising a stretched polyolefin film containing an inorganic fine powder (see JP-B-46-40794 corresponding to U.S. Pat. No. 4,318,950 (the term "JP-B" as used herein means an "examined published Japanese patent application"), JP-A-61-279543 (the term "JP-A" as used herein means an "unexamined published Japanese patent application), and JP-A-61-3748) is printed using the above-described quick-drying offset ink, the polyolefin becomes swollen with the vehicle contained in the quick-drying offset ink (particularly a high-boiling petroleum series solvent, such as mineral oil), and the printed film or synthetic paper suffers from so-called solvent attack, i.e., partial development of unevenness of the surface or curling of the entire film in case of solid printing. In addition the ink is slow to dry on the polyolefin film or synthetic paper. Hence, practical application of such quick-drying offset inks has involved difficulties.

Therefore, in actual offset printing on polyolefin films, a special offset ink exclusively designed for polyolefin films which contains no mineral oil (the ink for non-paper shown in Table 2) is employed at the expense of quick drying properties.

However, since such a special offset ink exclusive for polyolefin films requires a long drying time, and printing businesses and ink manufacturers capable of dealing with the special offset inks are limited, it has been desired to develop polyolefin films or synthetic paper on which general-purpose offset inks of the oxidative polymerization type (drying oil type) can be applied.

Since it is common for general printers to carry out offset printing of pulp paper, such as fine paper and coated paper, using commercially available quick-drying inks, they must substitute the quick-drying ink with the special offset ink for non-absorbing materials each time a polyolefin film or synthetic paper is to be printed.

Considering the increased time and labor involved in the ink substitution, general printers are unwilling to undertake printing of polyolefin films or synthetic paper. This has been one of the factors preventing a broader application of polyolefin films or synthetic paper in offset printing.

SUMMARY OF THE INVENTION

An object of the present invention is to provide synthetic paper which does not suffer from solvent attack even when printed with general-purpose offset ink for pulp paper.

In one embodiment the present invention provides a thermoplastic resin stretched film laminate having excellent printability which comprises a biaxially stretched thermoplastic resin film base layer (which may contain inorganic powder) having provided on one or both sides thereof a surface layer, the surface layer comprising a uniaxially stretched thermoplastic resin film containing 3 to 30% by weight of a petroleum resin, 30 to 65% by weight of precipitated calcium carbonate having a particle size of 0.1 to 3 μm, and 32 to 67% by weight of a thermoplastic resin and having a thickness of not less than 2 μm.

In another embodiment, the present invention provides a thermoplastic resin stretched film laminate comprising a biaxially stretched thermoplastic resin film base layer (which may contain inorganic powder), a lamina provided on one or both sides of said base layer, and a surface layer provided on one or both of said laminae, the lamina comprising a uniaxially stretched thermoplastic resin film containing 3 to 30% by weight of a petroleum resin and having a thickness of 2 to 25 μm, and the surface layer comprising a uniaxially stretched thermoplastic resin film containing 30 to 65% by weight of precipitated calcium carbonate having a particle size of 0.1 to 3 μm and having a thickness of 2 to 20 μm.

The presence of the petroleum resin affords protection against solvent attack, and the presence of precipitated calcium carbonate in the surface layer accelerates drying of applied offset printing ink and provides improved ink adhesion.

Figure 1:
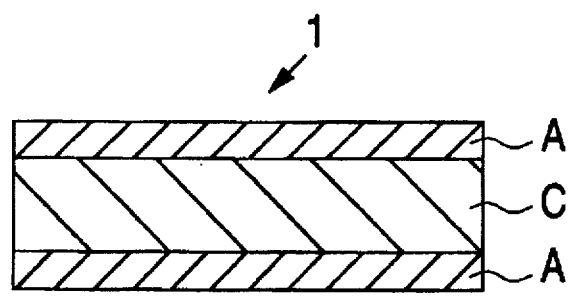
FIG. 1 is a cross section showing one embodiment of the stretched film laminate of the present invention.

Explanation of Reference Characters:
1 . . . Stretched film laminate
A . . . Surface layer
D . . . Lamina
C . . . Base layer
2 . . . Printed film
3 . . . Flat plate
h . . . Curl height (mm)

DETAILED DESCRIPTION OF THE INVENTION

Figure 2:
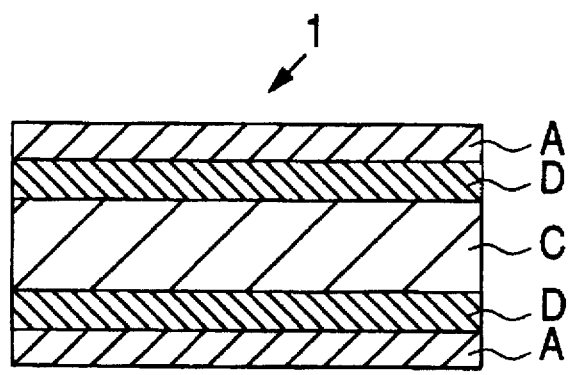
FIG. 2 is a cross section showing another embodiment of the stretched film laminate of the present invention.

The thermoplastic resin stretched film laminate of the present invention includes, in one embodiment, synthetic paper having the layer structure shown in FIG. 1, in which film laminate 1 has at least base layer (C) and surface layers (A) containing a petroleum resin and precipitated calcium carbonate and, in another embodiment, synthetic paper having the layer structure shown in FIG. 2, in which film laminate 1 has at least base layer (C), laminae (D) containing a petroleum resin, and surface layers (A) containing precipitated calcium carbonate.

I. Constituent Material (a) Thermoplastic Resin

The thermoplastic resins used in the present invention include polyolefin, polyamide, polyethylene terephthalate, polycarbonate, etc. Polyolefin resins are preferred for their resistance to solvent attack.

Examples of suitable polyolefin resins include linear polyethylene, branched polyethylene, polypropylene, and random or block copolymers comprising propylene as a main component and α-olefins, such as an ethylene, butene-1, hexene-1, heptene-1, 4-methylpentene-1, and 3-methylpentene-1.

(b) Petroleum Resin

The petroleum resin which can be incorporated into the thermoplastic resin stretched film laminate is a hydrocarbon resin (a polymer or a hydrogenation product thereof) obtained by polymerizing a petroleum raw material resulting from thermal cracking of petroleum in the presence of a catalyst for polymerization. The petroleum resin is preferably composed of a mixture of resin-forming monomers, such as terpene, dicyclopentadiene, styrene, methylstyrene, vinyltoluene, indene, methylindene, butadiene, isoprene, piperylene, and pentylene. The polymer may be a homopolymer of one of these monomers or a mixture of such homopolymers or a copolymer of some of these monomers.

In more detail, petroleum resins can be generally classified by raw material into the following groups according to JET, Vol. 37, No. 2, pp. 75–79 (1989):

(1) Aliphatic petroleum resins ($C_5$ petroleum resins)

(2) Aromatic petroleum resins ($C_9$ petroleum resins)

(3) Aliphatic/aromatic or aliphatic/alicyclic copolymer petroleum resins ($C_5/C_9$ petroleum resins)

(4) Dicyclopentadiene series petroleum resins (DCPD petroleum resins)

(5) Hydrogenated petroleum resins derived from resins (1) to (4) by hydrogenation.

Petroleum resins which can preferably be used in the present invention are hydrocarbon resins and include hydrocarbon polymers preferably having a melting point of 60 to 150° C., more preferably 70° to 130° C. The petroleum resins are derived from coke oven gas, coal tar fraction, or obtained by decomposing and thermally cracking petroleum raw materials, essentially pure hydrocarbon raw materials, hydrocarbon raw materials derived from turpentine oil, or turpentine oil. Typical hydrocarbon resins include coumarone-indene resins, $C_5$ petroleum resins, styrene copolymers, dicyclopentadiene resins, and terpene resins.

These resins are described in Kirk-othmer, Encyclopedia of Chemical Technology, Vol. 3, No. 11, pp. 242–255 (1966).

Coumarone-indene resins are hydrocarbon resins obtained by polymerization of resin-forming substances present in a coal tar distillate recovered from a coke oven, phenol-modified coumarone-indene resins, and derivatives thereof.

$C_5$ petroleum resins are obtained by polymerizing the $C_5$ cut of cracked petroleum or pentadiene recovered after extraction of an isoprene monomer from the $C_5$ cut as a main raw material usually using an aluminum halide catalyst.

Styrene copolymers include low-molecular-weight styrene homopolymer resins and copolymer resins of styrene and, e.g., α-methylstyrene, vinyltoluene, butadiene or indene, specifically alkylstyrene-indene copolymers.

Dicyclopentadiene resins include homopolymer resins or copolymer resins of dicyclopentadiene derived from a coal tar fraction or separated petroleum gas. The dicyclopentadiene resins are prepared by maintaining the dicyclopentadiene-containing raw material at a high temperature for a considerably long time, resulting in the formation of dimer, trimer and/or high polymer depending on the temperature.

Terpene resins include polymers of terpenes, i.e., hydrocarbons represented by the empirical formula $C_{10}H_{16}$ present in most essential oils and oleoresins, and phenol-modified terpene resins, for example α-pinene, β-pinene, dipentene, limonene, myrcene, bornylene, camphene, and the like.

Particularly preferred petroleum resins are hydrogenated petroleum resins (5) having a (ring and ball) softening point of 70° to 150° C. and hydrogenated terpene resins (2).

Hydrogenated petroleum resins include "ARKON", produced by Arakawa Kagaku Kogyo K.K.; "CLEARON", produced by Yasuhara Chemical K.K.; "ESCOREZ", produced by Tonex Co., Ltd.; "FTR", produced by Mitsui Petrochemical Industries, Ltd.; and "MARUKAREZ", produced by Maruzen Sekiyu Kagaku K.K.

(c) Precipitated Calcium Carbonate

Precipitated calcium carbonate used in the present invention can be obtained by (1) a method comprising blowing carbonic acid gas into milk of lime prepared by hydration of slaked lime to precipitate crystalline calcium carbonate, (2) a method comprising allowing the crystalline calcium carbonate obtained in method (1) to further increase in slaked lime to which carbonic acid gas is blown, and (3) a method comprising reacting soda ash with calcium chloride. The precipitated calcium carbonate used in the present invention has a particle size of 0.1 to 3 µm, preferably 1 to 2 µm, as measured with a laser diffraction type particle size measuring apparatus Microtrack, a trade name of Nikkiso Co., Ltd.

If the particle size is less than 0.1 µm, the small bulk density makes it difficult to prepare a stable composition with a thermoplastic resin. Particle sizes greater than 3 µm produce only slight effects in accelerating the drying of printing ink.

The precipitated calcium carbonate preferably has a specific surface area of 35,000 to 50,000 cm$^2$/g as measured with a constant air pressure type specific surface area measuring apparatus SS-100, a trade name of Shimadzu Corporation, which corresponds to a BET specific surface area of 12 to 20 m$^2$/g.

(d) Inorganic Fine Powder

Inorganic fine powder can be incorporated into base layer (C), lamina (D), and, if desired, surface layer (A) so as to provide nuclei for forming a number of microvoids therearound on stretching. Examples of the inorganic fine powder are calcium carbonate, calcined clay, diatomaceous earth, talc, titanium oxide, barium sulfate, aluminum sulfate, and silica. The inorganic fine powder preferably has an average particle size of not greater than 10 µm, still preferably not greater than 4 µm.

The content of the inorganic fine powder in base layer (C) preferably is less than the content of the precipitated calcium carbonate in surface layer (A).

II. Formation of Thermoplastic Resin Stretched Film

The thermoplastic resin stretched film laminate having excellent printability according to a first embodiment of the present invention is obtained as follows. A thermoplastic resin film containing preferably up to 60%, more preferably 10 to 45%, by weight of inorganic fine powder and preferably 40 to 100%, more preferably 55 to 90%, by weight of a thermoplastic resin is stretched uniaxially at a stretch ratio of preferably 3 to 10, more preferably 4 to 7, to prepare uniaxially stretched film as base layer (C). Separately, a thermoplastic resin composition (A) containing 3 to 30%, preferably 5 to 25%, by weight of a petroleum resin, 30 to 65%, preferably 40 to 55%, by weight of precipitated calcium carbonate, and 32 to 67%, preferably 40 to 60%, by weight of a thermoplastic resin is melt-kneaded in an extruder, extruded through the die, and laminated on the front side or both the front and back sides of base layer (C). The resulting laminate is then stretched in the direction perpendicular to the stretching direction of the uniaxially stretched film base layer (C) at a stretch ratio of preferably 3 to 15, more preferably 4 to 12. The thus prepared film laminate is synthetic paper having an A/C structure or an A/C/A structure.

The thermoplastic resin stretched film laminate having excellent printability according to a second embodiment of the present invention is obtained as follows. A thermoplastic resin film containing preferably up to 60%, more preferably 10 to 45%, by weight of inorganic fine powder and preferably 40 to 100%, more preferably 55 to 90%, by weight of a thermoplastic resin is stretched uniaxially at a stretch ratio of preferably 3 to 10, more preferably 4 to 7, to prepare uniaxially stretched film base layer (C). A thermoplastic resin composition (D) for a lamina containing preferably up to 65%, more preferably 10 to 60%, by weight of inorganic fine powder, 3 to 30%, preferably 5 to 25%, by weight of a petroleum resin, and preferably 32 to 97%, more preferably 50 to 60%, by weight of a thermoplastic resin and a thermoplastic resin composition (A) for a surface layer containing 30 to 65%, preferably 40 to 55%, by weight of precipitated calcium carbonate and preferably 35 to 70%, more preferably 40 to 60%, by weight of a thermoplastic resin are separately melt-kneaded in respective extruders, fed to the same co-extrusion die, laminated in the co-extrusion die (A/D), and co-extruded from the die and laminated in the molten state on the front side or both the front and back sides of base layer (C). The resulting laminate is then stretched in the direction perpendicular to the stretching direction of the uniaxially stretched film base layer (C) at a stretch ratio of preferably 3 to 15, more preferably 4 to 12, to provide synthetic paper having an A/D/C structure or an A/D/C/D/A structure.

These thermoplastic resin stretched film laminates can be prepared by blown-film extrusion, T-die extrusion or a combination thereof.

If the amount of the petroleum resin in surface layers (front surface layer and back surface layer) (A) or laminae (D) is less than 3% by weight, the effect of preventing curling is not produced. The presence of 30% by weight or less of the petroleum resin is sufficient to prevent curling. If the amount of the petroleum resin exceeds 30% by weight, melt-kneading in an extruder is difficult.

Presence of the petroleum resin in surface layer (A) or lamina (D) is sufficient to produce the curling preventive effect. Since the petroleum resin present in lamina (D) gradually migrates with time to surface layer (A), it is not always necessary to incorporate a petroleum resin into surface layer (A).

In the thermoplastic resin film laminate of the present invention, lamina (D) should have a thickness of not less than 2 µm, preferably 5 to 25 µm. The surface layer (A) should have a thickness of not less than 2 µm, preferably 2 to 20 µm, more preferably 5 to 15 µm. If surface layer (A) is thicker than 20 µm, the resulting film laminate, when offset printed with general-purpose offset inks of oxidative polymerization type (drying oil type), tends to develop unevenness on its surface or curling as a whole, and if surface layer (A) is thinner than 2 µm, the speed of drying offset ink on the resulting film laminate is slow.

The curling preventive effect brought about by incorporation of a petroleum resin seems attributed partly to improvement in rigidity of the stretched film laminate due to the alicyclic and/or aromatic molecular structure of petroleum resins, and partly to the good compatibility between the petroleum resin and a high-boiling (270° to 330° C.) petroleum series solvent used in offset inks, by which the petroleum resin easily bleeds out on the printed surface of the film laminate and also easily penetrates into the microvoids of the film laminate thereby preventing swelling of the film laminate.

What is important in the first embodiment is the balance of swelling between the petroleum resin and the thermoplastic resin in surface layer (A), and, in the second embodiment, the balance of swelling between surface layer (A) and lamina (D). If the petroleum-containing layers (A) and (D) have too small a thickness or too low a petroleum resin content, or if surface layer (A) is too thick, the balance of swelling in the stretched film laminate would be destroyed so that so-called solvent attack can result.

If the content of precipitated calcium carbonate in surface layer (A) is less than 30% by weight, or if the thickness of surface layer (A) is smaller than 2 μm, no effect of accelerated ink drying is observed. If the precipitated calcium carbonate content exceeds 65% by weight, it is difficult to prepare a stable thermoplastic resin composition. For economic purposes, in the first embodiment of the present invention of three layer laminate (A/C/A), the upper limit of the thickness of surface layer (A) is 80 μm, preferably 25 μm.

The base layer (C) for use in the present invention preferably has a thickness of 30 to 150 μm.

The thermoplastic resin stretched film laminate of the present invention preferably has a thickness of 50 to 200 μm in total.

III. Offset Printing

The resulting thermoplastic resin film laminate of the present invention having excellent printability can be offset printed by adhering an offset ink on its surface by means of an offset printing press.

(1) Offset Ink

The offset ink, in general, consists basically of main components comprising a pigment and a vehicle and auxiliaries comprising a viscosity modifier, a drying controlling agent, and other additives as shown in Tables 1 and 2 above.

(a) Pigment

The pigments include azo pigments, such as lithol red and benzidine yellow; lake pigments, such as permanent green, permanent rhodamine, permanent blue, and Lake Red C; organic pigments, such as Brilliant Carmine 6B and Phthalocyanine Blue; and inorganic pigments, such as alumina, barium sulfate, red iron oxide, chrome yellow, Prussian blue, titanium white, and carbon black.

(b) Vehicle

Vehicles include synthetic resins, vegetable oils (drying oils), and solvents.

Specific examples of these vehicles are:

1) linseed oil type vehicles, such as linseed oil and stand oil, and alkyd type vehicles, such as drying oil-modified alkyd resins, 2) quick-drying resin type vehicles mainly comprising a resin varnish which is prepared by dissolving a rosin-modified phenolic resin in a mixture of linseed oil and tung oil or a low-viscosity linseed oil varnish and controlling the viscosity by addition of a petroleum fraction having a narrow boiling point range, and 3) heat-set type vehicles, such as varnish prepared by dissolving a resin in a petroleum fraction having a narrow boiling point range.

(c) Viscosity Modifier

The viscosity modifier includes solvents, diluted varnishes, and polymer.

(d) Drying Controlling Agent

The drying controlling agent includes driers and drying inhibitors.

(e) Other Additives

Other additives include waxes, membrane-reinforcing agents, and back stain inhibitors.

(2) Offset Printing Method

Offset printing of the thermoplastic resin film laminate of the present invention with the above-mentioned offset ink can be carried out in a usual manner as with general offset printing by the use of commercially available offset printing machines.

When general-purpose offset inks of oxidative polymerization type (drying oil type) is adhered to the surface of the thermoplastic resin stretched film laminate of the present invention by offset printing, the printed stretched film laminate, (i.e., synthetic paper) rarely develops unevenness on its surface or curling as a whole.

The present invention will now be illustrated in greater detail with reference to the accompanying Examples and Comparative Examples. Unless otherwise indicated, all the parts and percents are by weight. The evaluations in the Examples and Comparative Examples were made according to the following methods.

(1) Height of Curl

A film to be evaluated was printed solid on an offset printing press Daia Printing Machine (trade name of a two-color printing machine, manufactured by Mitubishi Heavy Industries, Ltd.), using a drying type offset ink Bestack NP-1 Black, produced by T & K K.K., at an ink transfer amount of 1 g/m².

Figure 3:
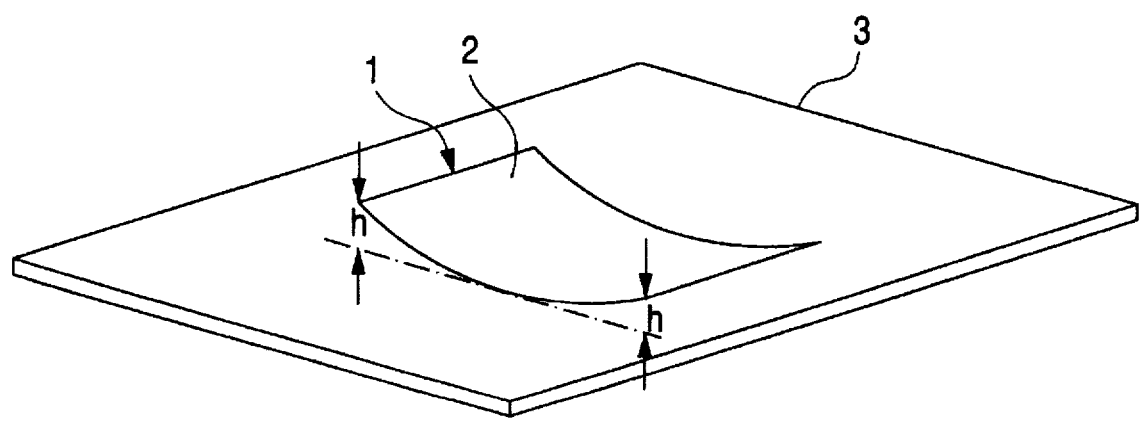
FIG. 3 is a perspective view illustrating the method of measuring the height of curl of the printed film in the Examples.

As shown in FIG. 3, the printed film 2 cut to a size of 12 cm×5 cm was placed on a flat plate for 24 hours, and the height (h) of the curl was measured.

(2) Development of Unevenness

A film to be evaluated was printed on an offset printing press using a drying type offset ink Bestack NP-1 Black, produced by T & K K.K., at an ink transfer amount of 1 g/m² to give a checkered pattern (1 cm×1 cm).

The film unevenness formed by the printed part and the non-printed part was judged visually and graded according to the following standard.

A . . . No unevenness observed

B . . . Slight unevenness observed to a degree acceptable for practical use

C . . . Medium between B and D

D . . . Marked unevenness (3) Ink Drying Properties

A film to be evaluated was printed on an offset printing press using a drying type offset ink Bestack NP-1 Black, produced by T & K K.K., at a printing speed of 100 copies per minute to obtain 2,000 copies. The ink drying properties were evaluated in terms of time required, when the stack of the printed copies was pressed with a finger, for the ink on the 5th copy from the top to dry so as not to stain the back side of the 4th copy, and graded according to the following standard.

A . . . The above-identified time is within 1 hour.

B . . . The above-identified time is within 3 hours.

C . . . The above-identified time is longer than 3 hours and within 5 hours.

D . . . The ink causes back staining even after 5 hours.

EXAMPLE 1

Preparation of Base Layer (1) A composition of 85% of polypropylene (expressed as PP in the Tables) having a melt flow rate (MFR; 230° C.; 2.16 kg weight) of 0.8 g/10 min and a melting point of 167° C. and 15% of ground calcium carbonate (simply expressed as Gd in the Tables) having an average particle size of 3.5 μm in terms of cumulative 50% diameter measured with Microtrack was melt-kneaded in an extruder set at 270° C., extruded into sheeting through a die, and cooled by a cooling apparatus to prepare an unstretched sheet.

The unstretched sheet was heated to 150° C. and stretched in the machine direction at a stretch ratio of 5 to obtain uniaxially stretched film (C).

(2) Composition (A) of 40% of polypropylene (represented as PP in the Tables) having an MFR of 4.0 g/10 min and a melting point of 164° C., 45% of precipitated calcium carbonate (simply represented as Pd in the Tables)

having an average particle size of 1.5 μm in terms of 50% cumulative diameter measured with Microtrack, and 15% of a petroleum resin produced by Arakawa Kagaku K.K., ARKON P140 (a trade name; softening point: 140° C.) was melt-kneaded in two separate extruders set at 220° C., fed to respective dies, and extrusion laminated on each side of the uniaxially stretched film (C) (A/C/A).

After once cooled to 60° C., the resulting laminated sheet was again heated to 162° C., stretched in the transverse direction at a stretch ratio of 7.5 by means of a tenter, subjected to annealing at 167° C., and cooled to 60° C. The edges were trimmed to obtain a 3-layered thermoplastic resin stretched film with excellent printability (A/C/A thickness: 15 μm/70 μm/15 μm).

The results of evaluation of the resulting film laminate are shown in Table 3 below.

EXAMPLES 2 TO 10

Stretched resin film laminates were prepared in the same manner as in Example 1, except for changing the formulations of surface layer (A) and base layer (C) as shown in Table 3. The results obtained are shown in Table 3.

COMPARATIVE EXAMPLES 1 TO 5

Stretched resin film laminates were prepared in the same manner as in Example 1, except for changing the formulations of surface layer (A) and base layer (C) as shown in Table 3. The results obtained are shown in Table 3.

Tables) having an average particle size of 3.5 μm in terms of cumulative 50% diameter measured with Microtrack was melt-kneaded in an extruder set at 270° C., extruded into sheeting through a die, and cooled to 55° C. by a cooling apparatus to prepare an unstretched sheet.

The unstretched sheet was heated to 150° C. and stretched in the machine direction at a stretch ratio of 5 to obtain uniaxially stretched film (C).

(2) Composition (D) of 40% of polypropylene (represented as PP in the Tables) having an MFR of 4.0 g/10 min, 45% of ground calcium carbonate (represented as Gd in the Tables) having an average particle size of 3.5 μm in terms of 50% cumulative diameter measured with Microtrack, and 15% of a petroleum resin ARKON P140 (a trade name of Arakawa Kagaku K.K.; softening point: 140° C.) was melt-kneaded in two separate extruders set at 220° C.

(3) Composition (A) of 55% of polypropylene (represented as PP in the Tables) having an MFR of 3.5 g/10 min and a melting point of 164° C. and 45% of precipitated calcium carbonate (referred to as Pd in the Tables) having an average particle size of 1.5 μm in terms of cumulative 50% diameter measured with Microtrack was melt-kneaded in two separate extruders set at 220° C.

(4) Molten resins (D) and (A) were fed to two separate co-extruders, melt laminated in the die (A/D), and extrusion laminated from the co-extrusion die at 220° C. on each side of uniaxially stretched film (C) with layer (A) outside.

After once cooled to 60° C., the resulting laminated sheet was again heated to 162° C., stretched in the transverse

TABLE 3

Thermoplastic Resin Stretched Film Laminate

| | Surface Layer (A) (uniaxially stretched) | | | | | Base Layer (C) (biaxially stretched) | | | | Offset Printability | | |
|---|---|---|---|---|---|---|---|---|---|---|---|---|
| Example No. | Thermoplastic Resin (%) | | Petroleum Resin (%) | CaCO₃ Fine powder (%) | Thickness (μm) | Thermoplastic Resin (%) | | Inorganic Fine Powder (%) | Thickness (μm) | Curl Height (mm) | Unevenness | Drying Properties |
| Example 1 | PP | 40 | ARKON P140 15 | Pd 45 | 15 | PP | 85 | Gd 15 | 70 | 1 | A | A |
| Example 2 | PP | 40 | CLEARON P125 15 | Pd 45 | 15 | PP | 85 | Gd 15 | 70 | 3 | A | A |
| Example 3 | PP | 40 | ESCOREZ E5320 15 | Pd 45 | 15 | PP | 85 | Gd 15 | 70 | 2 | A | A |
| Example 4 | PP | 50 | ARKON P140 5 | Pd 45 | 15 | PP | 85 | Gd 15 | 70 | 7 | B | A |
| Example 5 | PP | 45 | ARKON P140 10 | Pd 45 | 15 | PP | 85 | Gd 15 | 70 | 1 | A | A |
| Example 6 | PP | 40 | ARKON P140 15 | Pd 45 | 15 | PP | 85 | Gd 15 | 70 | 3 | A | A |
| Example 7 | PP | 45 | ARKON P140 15 | Pd 40 | 15 | PP | 85 | Gd 15 | 78 | 5 | A | B |
| Example 8 | PP | 35 | ARKON P140 15 | Pd 50 | 15 | PP | 85 | Gd 15 | 70 | 5 | A | A |
| Example 9 | PP | 40 | ARKON P140 15 | Pd 45 | 10 | PP | 85 | Gd 15 | 80 | 6 | A | A |
| Example 10 | PP | 40 | ARKON P140 15 | Pd 45 | 15 | PP | 100 | — — | 70 | 8 | A | A |
| Compara. Example 1 | PP | 55 | — — | Pd 45 | 15 | PP | 85 | Gd 15 | 70 | 35 | D | A |
| Compara. Example 2 | PP | 53 | ARKON P140 2 | Pd 45 | 15 | PP | 85 | Gd 15 | 70 | 30 | D | A |
| Compara. Example 3 | PP | 40 | ARKON P140 15 | Pd 45 | 1 | PP | 85 | Gd 15 | 98 | 30 | D | C |
| Compara. Example 4 | PP | 40 | ARKON P140 15 | Gd 45 | 15 | PP | 85 | Gd 15 | 70 | 5 | A | D |
| Compara. Example 5 | PP | 60 | ARKON P140 15 | Pd 25 | 15 | PP | 85 | Gd 15 | 70 | 5 | A | D |

Note:
ARKON P140: a trade name of the product produced by Arakawa Kagaku K.K.
CLEARON P125: a trade name of the product produced by Yasuhara Chemical K.K.
ESCOREZ E5320: a trade name of the product produced by Tonex Co., Ltd.

EXAMPLE 11

(1) Composition (C) of 85% of polypropylene (expressed as PP in the Tables) having an MFR of 0.8 g/10 min and 15% of ground calcium carbonate (simply expressed as Gd in the direction at a stretch ratio of 7.5 by means of a tenter, subjected to annealing at 167° C., and cooled to 60° C. The edges were trimmed to obtain a 5-layered thermoplastic resin stretched film with excellent printability (A/D/C/D/A thickness: 10 μm/15 μm/50 μm/15 μm/10 μm).

The results of evaluation of the resulting film laminate are shown in Table 4 below.

EXAMPLES 12 TO 21

Stretched film laminates were obtained in the same manner as in Example 11, except for changing the formulations of surface layers (A), laminae (D), and base layer (C). The results obtained are shown in Table 4.

COMPARATIVE EXAMPLES 6 TO 12

Stretched film laminates were obtained in the same manner as in Example 11, except for changing the formulations of surface layers (A), laminae (D), and base layer (C). The results obtained are shown in Table 4.

TABLE 4

| | Thermoplastic Resin Stretched Film Laminate | | | | | | | | | | Offset Printability | | |
|---|---|---|---|---|---|---|---|---|---|---|---|---|---|
| | Surface Layer (A) (uniaxially stretched) | | | Lamina (D) (uniaxially stretched) | | | | Base Layer (C) (biaxially stretched) | | | | | |
| | Thermoplastic Resin (%) | Inorganic Fine Powder (%) | Thickness (μm) | Thermoplastic Resin (%) | Petroleum Resin (%) | Inorganic Fine Powder (%) | Thickness (μm) | Thermoplastic Resin (%) | Inorganic Fine Powder (%) | Thickness (μm) | Curl Height (mm) | Unevenness | Drying Properties |
| Example 11 | PP 55 | Pd 45 | 10 | PP 40 | ARKON P140 15 | Gd 45 | 15 | PP 85 | Gd 15 | 50 | 1 | A | A |
| Example 12 | PP 55 | Pd 45 | 5 | PP 40 | ARKON P140 15 | Gd 45 | 15 | PP 85 | Gd 15 | 60 | 2 | A | A |
| Example 13 | PP 55 | Pd 45 | 15 | PP 40 | ARKON P140 15 | Gd 45 | 15 | PP 85 | Gd 15 | 40 | 3 | A | A |
| Example 14 | PP 55 | Pd 45 | 10 | PP 40 | ARKON P140 15 | Gd 45 | 5 | PP 85 | Gd 15 | 70 | 7 | B | A |
| Example 15 | PP 55 | Pd 45 | 10 | PP 40 | ARKON P140 15 | Gd 45 | 10 | PP 85 | Gd 15 | 60 | 5 | A | A |
| Example 16 | PP 55 | Pd 45 | 10 | PP 40 | ARKON P140 15 | Gd 45 | 20 | PP 85 | Gd 15 | 40 | 7 | A | A |
| Example 17 | PP 60 | Pd 40 | 10 | PP 40 | ARKON P140 15 | Gd 45 | 15 | PP 85 | Gd 15 | 50 | 1 | A | B |
| Example 18 | PP 50 | Pd 50 | 10 | PP 40 | ARKON P140 15 | Gd 45 | 15 | PP 85 | Gd 15 | 50 | 2 | A | A |
| Example 19 | PP 55 | Pd 45 | 10 | PP 45 | ARKON P140 10 | Gd 45 | 15 | PP 85 | Gd 15 | 50 | 5 | A | A |
| Example 20 | PP 55 | Pd 45 | 10 | PP 50 | ARKON P140 5 | Gd 45 | 15 | PP 85 | Gd 15 | 50 | 8 | B | A |
| Example 21 | PP 55 | Pd 45 | 10 | PP 40 | ARKON P140 15 | Gd 45 | 15 | PP 100 | — — | 50 | 1 | A | A |
| Compara. Example 6 | PP 55 | Pd 45 | 10 | PP 55 | — | Gd 45 | 15 | PP 85 | Gd 15 | 50 | 35 | D | A |
| Compara. Example 7 | PP 55 | Pd 45 | 10 | PP 53 | ARKON P140 2 | Gd 45 | 15 | PP 85 | Gd 15 | 50 | 30 | D | A |
| Compara. Example 8 | PP 75 | Pd 25 | 10 | PP 40 | ARKON P140 15 | Gd 45 | 15 | PP 85 | Gd 15 | 50 | 2 | A | D |
| Compara. Example 9 | PP 55 | Gd 45 | 10 | PP 40 | ARKON P140 15 | Cd 45 | 15 | PP 85 | Gd 15 | 50 | 2 | A | D |
| Compara. Example 10 | PP 55 | Pd 45 | 10 | PP 40 | ARKON P140 15 | Gd 45 | 1 | PP 85 | Gd 15 | 78 | 30 | D | A |
| Compara. Example 11 | PP 55 | Pd 45 | 1 | PP 40 | ARKON P140 15 | Gd 45 | 15 | PP 85 | Gd 15 | 68 | 2 | A | D |
| Compara. Example 12 | PP 55 | Pd 45 | 25 | PP 40 | ARKON P140 15 | Gd 45 | 15 | PP 85 | Gd 15 | 20 | 25 | C | A |

Note:
ARKON P140: a trade name of the product of Arakawa Kagaku K.K.

Because the thermoplastic resin stretched film laminate according to the present invention contains a petroleum resin, it rarely develops unevenness on the surface or curling as a whole when printed with general-purpose offset inks of the oxidative polymerization type (drying oil type). The presence of precipitated calcium carbonate in the surface layer accelerates drying of the applied offset printing ink.

Thus, the film laminate of the present invention exhibits excellent printability.

While the invention has been described in detail and with reference to specific embodiments thereof, it will be apparent to one skilled in the art that various changes and modifications can be made therein without departing from the spirit and scope thereof.

What is claimed is:

1. A thermoplastic resin stretched film laminate comprising a biaxially stretched thermoplastic resin film base layer having provided on one or both sides thereof a surface layer, said surface layer comprising a uniaxially stretched thermoplastic resin film containing 3 to 30% by weight of a petroleum resin, 30 to 65% by weight of precipitated calcium carbonate having a particle size of 0.1 to 3 μm, and 32 to 67% by weight of a thermoplastic resin and having a thickness of not less than 2 μm.

2. The thermoplastic resin stretched film laminate according to claim 1, wherein said base layer contains inorganic fine powder, the content of said inorganic fine powder in the base layer being less than the content of said precipitated calcium carbonate in said surface layer.

3. A thermoplastic resin stretched film laminate comprising a biaxially stretched thermoplastic resin film base layer, a lamina provided on one or both sides of said base layer, and a surface layer provided on one or both of said laminae, said lamina comprising a uniaxially stretched thermoplastic resin film containing 3 to 30% by weight of a petroleum resin and having a thickness of 2 to 25 μm, and said surface layer comprising a uniaxially stretched thermoplastic resin film containing 30 to 65% by weight of precipitated calcium carbonate having a particle size of 0.1 to 3 μm and having a thickness of 2 to 20 μm.

4. The thermoplastic resin stretched film laminate according to claim 3, wherein said base layer contains inorganic fine powder, the content of said inorganic fine powder in the base layer being less than the content of said precipitated calcium carbonate in said surface layer.

5. The thermoplastic resin stretched film laminate according to claim 1, wherein said precipitated calcium carbonate is present in an amount to accelerate drying of applied offset printing ink and provide improved ink adhesion upon offset printing.

6. The thermoplastic resin stretched film laminate according to claim 5, wherein said precipitated calcium carbonate has a particle size of one to two microns.

7. The thermoplastic resin stretched film laminate according to claim 6, wherein said precipitated calcium carbonate comprises a specific surface area of 35,000 to 50,000 $cm^2/g$.

8. The thermoplastic resin stretched film laminate according to claim 1, wherein said petroleum resin is selected from at least one of coumarone-indene resins, $C_5$ petroleum resins, styrene copolymers, dicyclopentadiene resins or terpene resins.

9. The thermoplastic resin stretched film laminate according to claim 8, wherein said petroleum resin is selected from hydrogenated petroleum resins having a (ring and ball) softening point of 70° to 150° C. or hydrogenated terpene resins.

10. A thermoplastic resin stretched film laminate according to claim 1, wherein:

said base layer has a thickness of 30 to 150 microns, and
said surface layer has a thickness of 2 to 20 microns.

11. A thermoplastic resin stretched film laminate according to claim 10, wherein said surface layer has a thickness of 5 to 15 microns.

12. A thermoplastic resin stretched film laminate according to claim 1, wherein said laminate comprises a thickness of 5 to 200 microns total.

* * * * *